Feb. 9, 1960 M. I. GOLDBERG 2,924,266
CHILD'S CAR SEAT

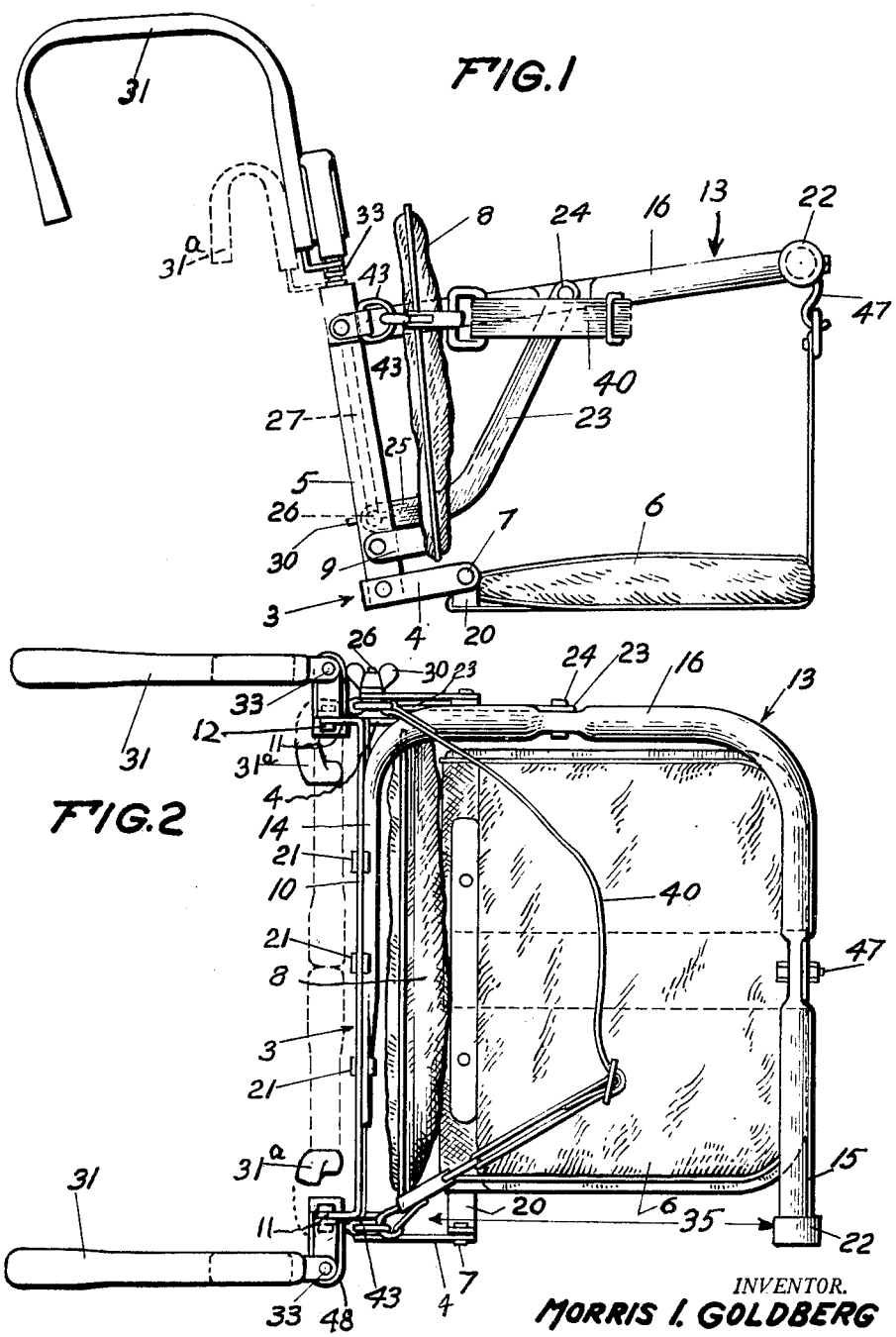

Filed Dec. 9, 1958 2 Sheets-Sheet 2

INVENTOR.
MORRIS I. GOLDBERG
BY Louis C. Smith
ATTORNEY

United States Patent Office 2,924,266
Patented Feb. 9, 1960

2,924,266

CHILD'S CAR SEAT

Morris I. Goldberg, Waban, Mass.

Application December 9, 1958, Serial No. 779,110

1 Claim. (Cl. 155—79)

This invention relates to a child's car seat such as is used for children when riding in an automobile, and the invention relates particularly to the guard member portion of a child's car seat.

An object of the invention is to provide a novel guard member which is so constructed that the child can be placed in the seat or removed therefrom through an open side of the seat structure. An advantage of this is that it obviates the necessity of lifting the child to a point entirely above the car seat and then lowering him into the seat when placing him therein. Moreover, with this invention the operation of removing a child from the seat is simplified as it involves merely the operation of moving the child sideways through the open side of the seat structure.

In the drawings wherein there is illustrated one embodiment of the invention,

Fig. 1 is a side view of a car seat embodying the invention;

Fig. 2 is a top plan view thereof;

Figure 4:
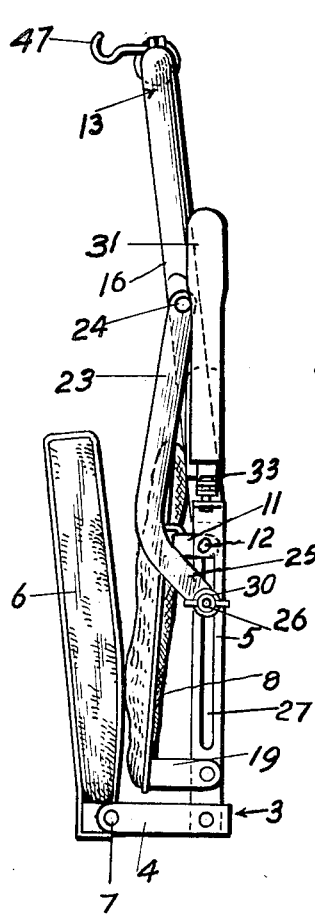
Fig. 4 is a side view of Fig. 3.

The seat herein shown comprises a seat frame which includes a base member 3 extending from one side to the other of the frame and having at each end the forwardly projecting, seat-supporting portion 4. The seat frame also includes two upright side members 5, one at each end of the base member 3, said uprights being rigidly connected at their lower ends to the base member and also being connected together near their upper ends by a guard-supporting member 10 on which the guard, presently to be described, is mounted, said guard-supporting member being pivotally connected to said uprights to turn about a horizontal axis. The seat element of the structure is shown at 6, and it is carried by a seat-supporting element 20 which is pivotally secured to the members 4, as shown at 7.

The structure also has a seat back 8 which is carried by a supporting element 9, the ends of which are rigidly secured to the side members 5.

The present invention relates particularly to a guard member for preventing the occupant of the seat from sliding forwardly off therefrom. This guard member is shown at 13 and it is a rigid structure having a rectangular U-shape which includes the two parallel leg members 14 and 15 and the bridge connecting portion 16. Said guard member is rigidly secured to the member 10; and for this purpose, the leg 14 of the guard member overlies and extends lengthwise of said member 10 and is rigidly secured thereto by rivets or bolts 21. The bridge member 16 of the guard member extends at right angles to the support member 10 and the other leg 15 of the guard member extends substantially parallel to the leg 14 and has a free end 22. The guard member may conveniently be made of metal tubing, although it may be made of any other suitable material, such as plastic material.

As stated above, the guard-supporting member 10 is pivotally secured to the uprights 5 of the seat frame to turn about a horizontal axis. In the construction shown this is accomplished by providing each end of the support member 10 with a laterally extending portion 11, said end portions being pivotally attached to the uprights 5 as shown at 12.

Figure 3:
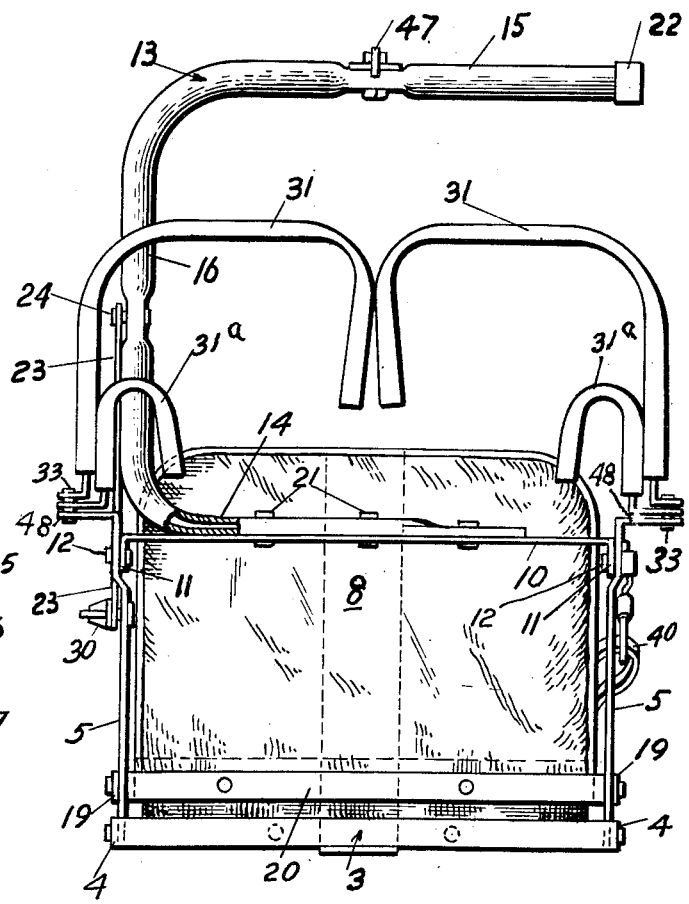
Fig. 3 is a rear view of the seat when in folded condition.
Figure 5:
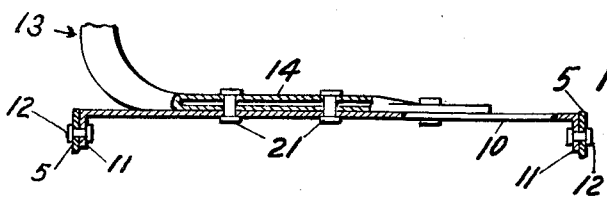
Fig. 5 is a fragmentary view partially in section to illustrate the manner of securing the guard-supporting member to the frame of the seat.

The guard member is thus mounted to swing about a horizontal axis between an operative horizontal position in which both legs 14 and 15 are in the same approximately horizontal plane and the leg 15 is located above the front edge of the seat 6 as shown in Fig. and a folded upright position shown in Figs. 3 and 4 in which said leg 15 is located above the guard-supporting member 10. The guard member 13 is held in its operative position by a brace 23, one end of which is pivoted at 24 to the bridge portion 16 of the guard member and the other end 25 of which overlies one of the side members 5 and is secured thereto by a bolt 26.

To permit the guard member to be folded said side member 5 is provided with a slot 27 in which the bolt 26 is received, said bolt 26 moving upwardly in the slot 27 as the guard member is swung from its operative position into its vertical folded position. When the guard member is in its operative position shown in Fig. the bolt 26 rests on the bottom of the slot 27 and thus holds the guard member from downward movement. The bolt 26 is provided with a wing nut 30 which, when tightened, clamps the lower end of the brace firmly against the side member 5, thus locking the guard member in its adjusted position.

The said frame is shown as provided with hook shaped hangers 31 by which the seat structure can be hung over the back of an automobile seat and also other smaller hangers 31a by which the seat may be hung over the back of a chair, thereby to provide a high chair which a child can use as a dining table. These hangers are pivotally secured to the outwardly extending upper ends 48 of the side members 5 as shown at 3 so that they can be swung from a folded position when the seat is to be stored into an operative position, shown in full lines Fig. 1 with respect to the hangers 31, when the seat is to be mounted on the back of an automobile seat. The dotted line position of the small hangers 31a shows their operative position.

With this construction, when the guard member 1 is in its lowered operative position shown in Fig. there will be an opening 35 between the free end 22 of the leg 15 of the guard member and the side member 5 through which a child may be moved in a horizontal direction to place him on the seat 6 or remove him therefrom.

If desired, an auxiliary guard member 40 in the form of a strap may be used to prevent the occupant of the seat from moving off from the seat through the open space 35. This strap 40 is detachably secured to one of two rigs 43, both of which are carried by the upper end of the side members 5.

The seat member 6 has a strap 46 secured thereto which is adapted to be detachably secured by any suitable separable fastening device, as shown at 47, to the leg 15 of the guard member when it is in its horizontal operative position as shown in Fig. 1.

I claim:

In a guard member for a child's car seat of the type presenting a supporting frame having two upright side members, one at each side of the frame, and a seat member hinged to the frame at the bottom thereof, the combination with said upright side members, of a horizontal guard-supporting member extending from one side member to the other and pivotally connected to both side members to turn about a horizontal axis, a rigid U-shaped rectangular guard member having two horizontal parallel legs connected at one end by a straight bridge portion, one of said legs overlying and extending lengthwise of the guard-supporting member, means rigidly securing said leg to the guard-supporting member, the other leg having a free end and being spaced from the guard-supporting member by a distance substantially equal to the length of said bridge portion, said guard member and the guard-supporting member being swingable as a unit about said horizontal axis between a folded position in which the leg with the free end is in a horizontal position above the guard-supporting member, and an operative position in which said last-named leg is approximately in the same horizontal plane as said guard-supporting member and in a position above the front edge of said seat member, there being an unobstructed space between the free end of said last-named leg and the guard-supporting member whereby a child can be placed on the seat behind the leg with the free end or removed from the seat by a horizontal movement through said open space.

References Cited in the file of this patent
UNITED STATES PATENTS

| | | |
|---|---|---|
| 2,548,016 | Goldberg | Apr. 10, 1951 |
| 2,668,583 | Singer | Feb. 9, 1954 |
| 2,690,787 | Soltis | Oct. 5, 1954 |
| 2,690,790 | Linden | Oct. 5, 1954 |
| 2,774,411 | Berlin | Dec. 18, 1956 |